Aug. 10, 1948.   E. R. PRICE   2,446,884
BOOSTER FOR BRAKE SYSTEMS
Filed March 22, 1943   4 Sheets-Sheet 2

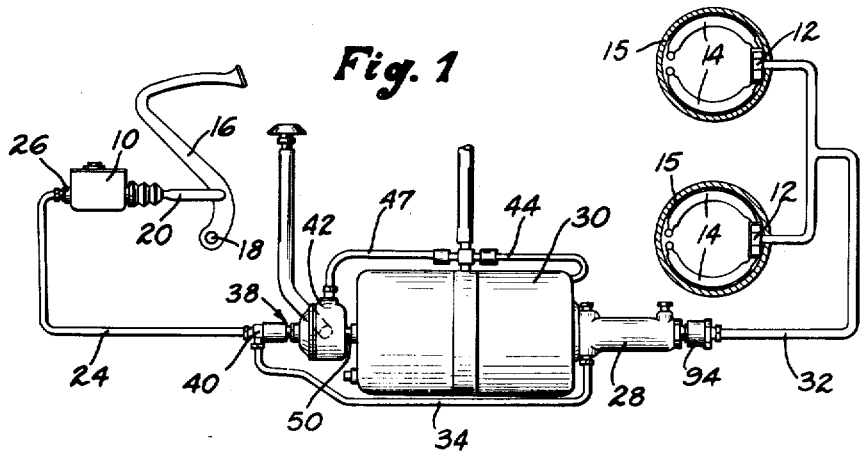
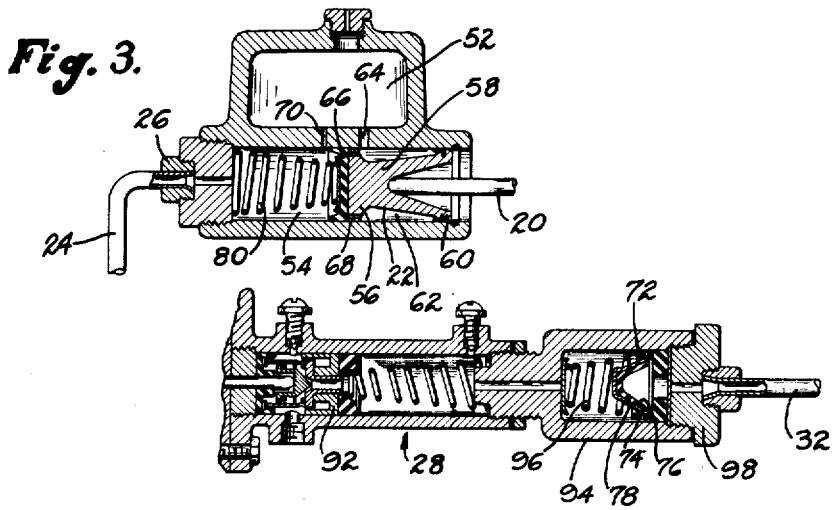
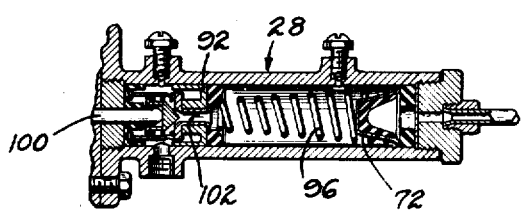

INVENTOR
EARL R. PRICE
BY

Aug. 10, 1948.        E. R. PRICE              2,446,884
                BOOSTER FOR BRAKE SYSTEMS
Filed March 22, 1943                      4 Sheets-Sheet 3

INVENTOR
EARL R. PRICE
BY

INVENTOR
EARL R. PRICE
BY
T. J. Plante

Patented Aug. 10, 1948

2,446,884

UNITED STATES PATENT OFFICE 2,446,884

BOOSTER FOR BRAKE SYSTEMS

Earl R. Price, South Bend, Ind., assignor to Bendix Aviation Corporation, South Bend, Ind., a corporation of Delaware Application March 22, 1943, Serial No. 479,974

16 Claims. (Cl. 60—54.5)

This invention relates to a booster, or power assistor, for a hydraulic brake system, the booster being utilized to supplement the manually-created brake applying pressure.

The device disclosed in this application is closely related to the devices of my copending applications, Serial No. 368,560, filed December 5, 1940, and issued July 18, 1944, as Patent No. 2,353,755, and Serial No. 407,117, filed August 16, 1941, and issued October 19, 1943, as Patent No. 2,332,340. All of the related applications disclose brake systems in which a conventional hydraulic brake actuating system is combined with a power assistor, which is operated in accordance with the manually created pressure in the hydraulic system, and which, during its operation, adds its pressure-creating effect to the pressure-creating effect of the operator's manual exertion.

The conventional hydraulic brake system utilizes a check valve in the master or pressure-producing cylinder to maintain, or tend to maintain a certain pressure in the brake lines, even though the brakes are being, or have been, released. Reasons for maintaining such a pressure in the brake lines include: (1) the desire to avoid drawing air into the wheel cylinders due to development of vacuum inside the wheel cylinders; and (2) the necessity to insure that the fluid in the brake lines will not return from wheel cylinder to master cylinder under the influence of gravity, should the wheel cylinder temporarily be higher than the master cylinder.

In hydraulic brake systems which are operated in part by power, as the systems shown in this application and my copending applications above referred to, it is customary to use the pressure created by the master cylinder piston for two purposes: (1) to force fluid under pressure directly to the brakes to operate them, and (2) to force fluid to a control valve which operates the power assistor, which in turn exerts pressure on the fluid operating the brakes. Obviously, the control valve must not operate the assistor until the operator desires to apply the brakes. If, then, the hydraulic fluid in the line connecting the master cylinder to the control valve is under a predetermined pressure even when the brakes are released, it will be necessary to provide a spring, or other resilient means, capable of holding the control valve in released or non-actuated position until the pressure in the master cylinder has been increased above the predetermined normal line pressure. Not only must the spring be capable of holding the control valve in released position, but it must also be under an excess load sufficient to insure release of the valve after brake application, regardless of the conditions maintaining.

An object of my invention is to provide a vacuum power assistor for a hydraulic brake system which will begin to operate immediately upon the creation of pressure in the master cylinder, so that the manual force necessary to get an appreciable braking effect will be light and the pedal "feel" will be exceptionally smooth.

A further object of my invention is to provide a power assistor unit for a hydraulic brake system in which the control valve for the power assistor may incorporate a hydraulically actuated piston large enough so that pressure against it will quickly operate the valve. Where the valve must have a spring strong enough to keep the valve from operating under residual line pressure in the hydraulic system, it is necessary to increase the strength of the spring in the valve whenever the size of the hydraulic piston in the valve is increased. So long as this is true, increasing the size of the piston for the purpose of obtaining a lighter initial pedal pressure cannot have any advantageous effect, except when less reaction or "feel" is desired.

The above objects were also aimed at in application Serial No. 407,117 (now Patent No. 2,332,340), referred to above. In that application, the problem was solved by utilizing a "double line" system, i. e. a system in which two lines lead from the master cylinder, one connecting the brake applying part of the system to the master cylinder on the pressure side of the check valve, and the other connecting the power assistor control to the master cylinder on the reservoir side of the check valve. Use of the "double line" system disclosed in the copending application referred to may cause a pumping or fluttering of the control pedal, which results from the alternate building up of the valve pressure and closing off of the pressure. This can only happen where there is a relatively long fluid line leading from the hydraulic motor which controls the power assistor valve (where the reaction occurs) back to the part of the hydraulic system which expands as the brakes are applied, i. e. the chamber behind the intermediate, or auxiliary, master cylinder piston through which the power assistor and the pedal controlled master cylinder both exert their force to apply the brakes. Causes of the fluttering referred to are as follows: (a) sluggishness in the brake fluid, particularly where it has a high viscosity, (b) the fact that more pressure is required to lift the poppets in the booster control valve off their seats than to hold them off, owing to the fact that the pressure differentials tend to hold the poppets seated, (c) friction in the mechanical parts of the system, (d) resistance in the hydraulic lines to movement of the hydraulic fluid, and (f) stickiness in the seals in the various hydraulic devices.

An important object of my invention is to provide both a "double line" and a "single line" system which have the advantage that they bring the power assistor into operation almost immediately after the pedal cylinder pressure is raised above reservoir pressure, while at the same time they do not have the disadvantage of pedal flutter caused by the lag between action and reaction.

This object may be accomplished in the "single line" system by providing a residual check valve in the auxiliary master cylinder, i. e., the master cylinder which contains the power operated piston. By placing the check valve on the output side of the auxiliary master cylinder (by output side is meant the side between the power cylinder and the brakes), I have subjected the whole assembly to atmospheric pressure in the released position and thereby eliminated the need for the additional pipe shown in application Serial No. 407,117 (now Patent No. 2,332,340).

The same object is provided in the "double line" system by having a direct hydraulic connection between the hydraulic motor which controls the power assistor valve and the chamber at the rear of the piston in the auxiliary master cylinder, and by placing a one-way check valve in said direct hydraulic connection, which allows flow of fluid from the valve control motor to the chamber but which prevents flow of fluid in the reverse direction. Provision of the direct hydraulic connection referred to, and the one-way valve, in reality makes the system a "single line" system in one direction and a "double line" system in the other.

Other objects and features of my invention will be apparent during the course of the following description.

In the accompanying drawings:

Figure 1 is a diagrammatic view of a power-assisted hydraulic brake system incorporating my invention;

Figure 3 is a section taken on a vertical plane through the master cylinder of Figure 1;

Figure 4 is a section on a vertical plane taken through the residual check valve assembly of Figure 1;

Figure 5 is a section on a vertical plane showing the auxiliary master cylinder and a modification of the residual check valve arrangement of Figure 4;

Figure 2:
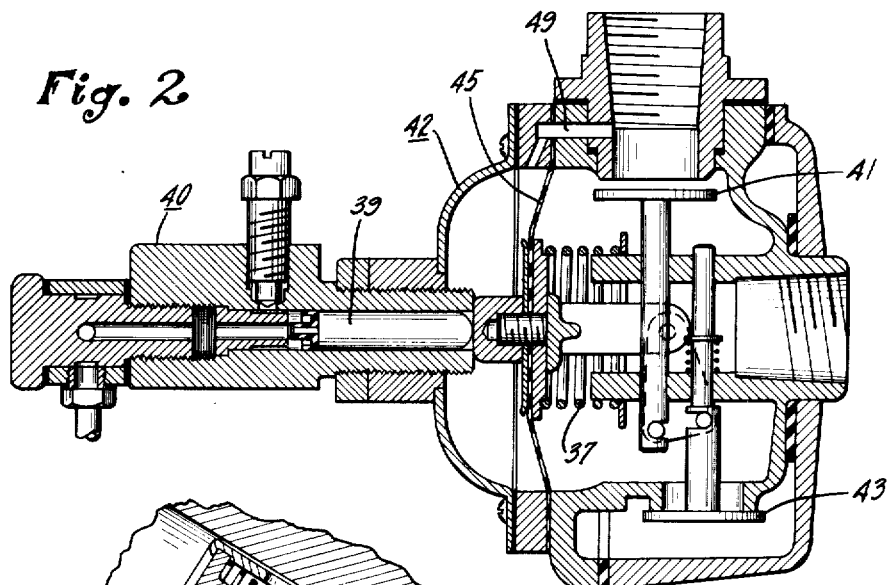
Figure 2 is an enlarged sectional view of the control valve shown in Figure 1.
Figure 9:
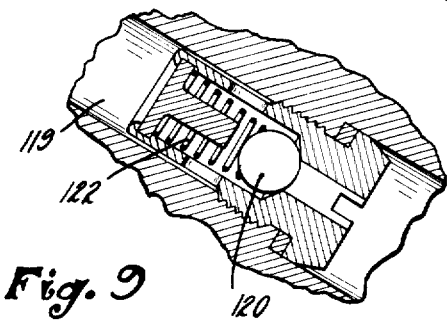
Figure 9 is a close-up of the ball valve device of Figure 8.

The brake illustrated diagrammatically in Figure 1 includes a conventional master cylinder 10 adapted to put liquid under pressure, and a plurality of conventional wheel cylinders 12 adapted to move shoes 14 against brake drums 16, under the influence of the pressure liquid. A manually operable pedal 16, pivoted at 18, has a rod 20 extending into the interior of the master cylinder 10 to engage a piston 22 (see Figure 3), said rod and piston being arranged to put the liquid in the master cylinder under pressure in response to manual actuation of the pedal 16. A liquid carrying conduit 24 is connected to the master cylinder 10, at master cylinder outlet 26, and the conduit 24 connects the master cylinder to a control, or relay, valve, indicated generally at 38. A branch 34 of conduit 24 connects master cylinder 10 to an auxiliary master cylinder 28. Adjacent to, and associated with, the auxiliary cylinder 28 is a pneumatic, or vacuum, power cylinder 30. The outlet end of the auxiliary cylinder 28, i. e. the end farthest from the power cylinder 30, is connected by a liquid carrying conduit 32 and a plurality of branches thereof to the wheel cylinders 12.

The control valve 38 comprises a hydraulic, or controlling, portion 40 and a pneumatic, or controlled, portion 42. A pneumatic, or vacuum, line 44, extending from a source of vacuum, as for example, the usual intake manifold, is connected to the right side of the power cylinder 30, i. e. the side farthest from the relay valve 38. A branch 47 of the line 44 extends to one side of the relay or control valve 38 and a passage 49 (see Fig. 2) connects the branch line 47 to the chamber in the left end of the relay valve 38, the left end being the end farthest from the power cylinder 30. A pneumatic pressure carrying line 50 connects one end of the relay valve 38 to the left or near end of the power cylinder 30.

Referring to Figure 3, it will be seen that the master cylinder 10 comprises a reservoir portion 52 and a cylinder, or pressure, portion 54. The piston 22 is reciprocable in the pressure, or cylinder, portion 54 and comprises a head 56, a body portion 58, and a skirt or rear flange 60. The body portion is of smaller diameter than the head or skirt portions so that an annular chamber 62 is formed between the head and skirt of the piston. This chamber is connected by a port 64 to the reservoir 52. A sealing cup 66 rests against the head of the piston, and a plurality of ports 68 are provided through the head of the piston connecting the annular chamber 62 to the rear of the sealing cup 66. A compensating port 70 connecting the reservoir 52 to the cylinder 54 is positioned just ahead of the sealing cup 66 when the piston and cup are in retracted position. A spring 80 urges the piston toward retracted position and at the same time holds the sealing cup in place.

The master cylinder construction, except for the omission of the usual residual line pressure check valve, is of conventional type, and its mode of operation will be readily understood. When the piston 22 is moved to the left, the port 70 is closed and fluid is forced through conduits 24 and 34 to the control valve 38 and the auxiliary cylinder 28, respectively.

As mentioned above, the relay or control valve 38 includes the hydraulic portion 40 and the pneumatic, or vacuum, portion 42. As will be apparent from reference to either of my copending applications Serial No. 368,560 (now Patent No. 2,353,755) or Serial No. 407,117 (now Patent No. 2,332,340), hydraulic pressure in the part 40 controls the part 42 in such manner that the power cylinder 30 is operated in accordance with operation of the master cylinder 10. A piston 39 is urged by the hydraulic pressure in the motor 40, acting against the resistance of a spring 37, in a direction tending to first close a vacuum poppet 41 and subsequently open an atmosphere poppet 43. A pressure differential over the diaphragm 45 which corresponds to the pressure differential over the piston in the power cylinder 30 creates a force tending to return the piston 39 to released position.

As shown in Figure 4, the auxiliary cylinder 28 has a piston 92 reciprocable therein between the point where conduit 34 connects to the cylinder and the forward end of the cylinder, which is connected by conduit 32 to the brakes. A casing 94 is connected between the forward end of the auxiliary cylinder 28 and conduit 32, and contains a residual pressure check valve 72. The check valve 72 comprises a casing 74, preferably metal, and a flexible inner portion 76 formed of rubber or like flexible material. A plurality of ports 78 open through the casing 74 to allow the fluid from cylinder 28 to flow against the outside edge or surface of the flexible member 76. A spring 96 biases the check valve toward a plug 98 which closes the forward end of the casing 94.

When fluid is forced from the interior of cylinder 28 toward conduit 32 and the brake applying cylinders 12, the fluid passes through the ports 78 and past the edge of the flexible member 76 into the conduit 32. When the brakes are released, fluid from the wheel cylinders 12 will enter the casing 94 and push against the sides of the flexible member 76 tending to close the ports 78. Therefore, the remaining fluid will have to overcome the force of the spring 96 before it can lift the casing 74 from its seat against plug 98 and return to the interior of cylinder 28 and thence to cylinder 10 and reservoir 52. Thus the check valve 72 and spring 96 serve to maintain a light pressure in the wheel cylinders 12, a pressure determined by the strength of the spring 96. As long as the brakes remain released, the hydraulic fluid in lines 24 and 34, in valve 38, and in cylinder 28 is under only atmospheric pressure. Because of this, the release spring 37 of the valve 38 need be only a light spring. If it is desired to make the hydraulic pressure more effective in opening the valve 38, the size of the piston 39 may be increased without necessitating an increase in the strength of the spring.

Operation of my power assistor, in general, is as follows:

When pressure is applied by the pedal 16 to the fluid in master cylinder 10, the fluid will be forced through conduits 24 and 34 and cylinder 28 to apply the brakes. As soon as a pressure sufficient to overcome the spring in the valve 38 has been reached, said valve will actuate the power cylinder by creating a pressure differential over a power cylinder piston (not shown), and this piston operates through a rod 100 to move the piston 92 in the cylinder 28, at the same time cutting off the passage 102 through the piston to prevent direct fluid communication between conduits 32 and 34. The general operation of my power assistor unit is more fully described in my copending application Serial No. 368,560 (now Patent No. 2,353,755), referred to above. Because the fluid in conduit 24 begins to actuate the valve 38 immediately upon increase of the master cylinder pressure above reservoir pressure, the power cylinder 30 is brought into operation more quickly than would otherwise be possible. This means a smoother and easier "feel."

The modified design disclosed in Figure 5 has the residual check valve 72 placed inside auxiliary cylinder 28. The spring 96 is compressed between the piston 92 and the check valve. Operation of the device is in all respects the same as operation of the device shown in Figures 1 to 4, inclusive.

The device shown in Figures 6 to 11, inclusive, incorporates a "double line" system. The residual line pressure check valve 72 is positioned inside the master cylinder 10, as is the case in conventional hydraulic brake systems. A conduit 106 leads from the master cylinder 10 at the rear of residual pressure valve 72 to a chamber 108 which has a piston 110 reciprocable therein, provided with a seal 111. Pressure of the fluid forced from master cylinder 10 to chamber 108 operates the piston 110 and valve device 112 in the usual manner. A second conduit 114 leads from the master cylinder 10 on the pressure side of valve 72 to a chamber 116 at the rear of the piston 92 in the auxiliary master cylinder 28. A passage 118 (see Fig. 7 for a close-up of the valve and passage) constitutes a direct hydraulic connection between chamber 108 and chamber 116. A one-way check valve is provided in the passage 118, the valve comprising a ball valve element 120 and a spring 122 urging the ball to seat. It will be apparent that free flow of fluid is thus permitted from chamber 108 to 116 but flow in the opposite direction, from chamber 116 to chamber 108, is prevented.

The valve device, indicated generally at 112, includes a pair of flexibly connected poppets 132 and 134, the poppet 132 being adapted to control the admission of air to chamber 136, and poppet 134 being adapted to control the evacuation of air from said chamber. The chamber 136 is connected by means of a control line 138 with the power cylinder 30, in order that the pressure prevailing in chamber 136 will also prevail in the rear of each of the tandem pistons in the power cylinder. Chamber 140 of the valve is continuously connected to a source of vacuum by a conduit 142 which connects to the chamber 144 of the power cylinder, said chamber 144 of the power cylinder being directly connected by means of a conduit 146 with the source of vacuum, such as the intake manifold 148. A passage 150 connects chamber 140 of the valve with chamber 152 of the power cylinder, thus maintaining chamber 152 at intake manifold pressure. Chamber 154 of the valve is connected directly to the atmosphere.

The poppets 132 and 134 are so connected that they move as a unit in the axial direction but they are capable of a slight relative lateral movement in order that they may both be properly aligned with their seats, thus preventing leakage. The poppets are connected by means of a flexible cable 156, which permits the necessary movement of the poppets to align themselves with their seats. In order that the structure will have sufficient strength to operate properly, the flexible cable 156 is encased in a pair of telescoping sleeves 158 and 160, each of which is connected to one of the poppets, and each of which is pinched slightly to retain one end of the cable. A slight radial clearance is provided between the two sleeves, in order that lateral flexing of the cable will be permitted.

As liquid under pressure is forced into chamber 108, piston 110 is moved upwardly, moving the yoke 162 and diaphragm 124. This movement brings the valve seat 164 into contact with poppet 134 cutting off chamber 136 from the vacuum source. Further movement upward of the piston and diaphragm, acting through the connection between the two poppets, pushes poppet 132 from its seat, allowing air at atmospheric pressure to enter chamber 136. The air, flowing through conduit 138 enters chamber 166 at the rear of piston 168 in the power cylinder. This air likewise flows through the openings 170 and the hollow piston rod 172 to chamber 174 at the rear of piston 176. Since chambers 144 and 152, which are in front of the respective pistons, are connected to the vacuum source, the air entering chambers 166 and 174 simultaneously urges both pistons forward to create pressure in the master cylinder 28. Use of the tandem pistons 168 and 176 makes it possible to build up power equivalent to that which would be developed over a single piston twice the size of either of the tandem pistons.

When the reaction pressure of diaphragm 124, i. e., the pressure of the air in chamber 136 against the vacuum in chamber 140, has built up sufficiently, the diaphragm will move downwardly permitting the valve to return to lapped position, in which both the vacuum and the atmosphere ports are closed.

Figure 7:
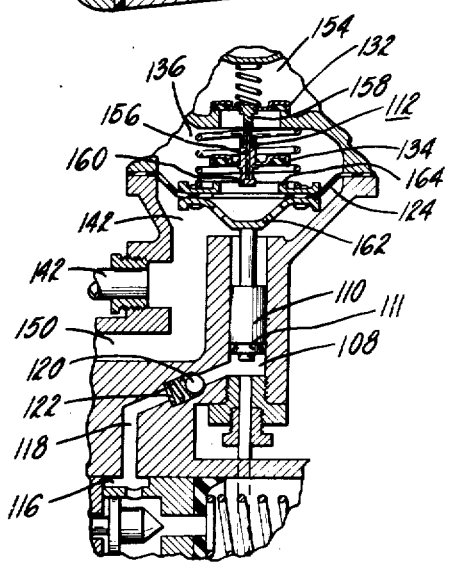
Figure 7 is a close-up of the valve shown in Figure 6.
Figure 6:
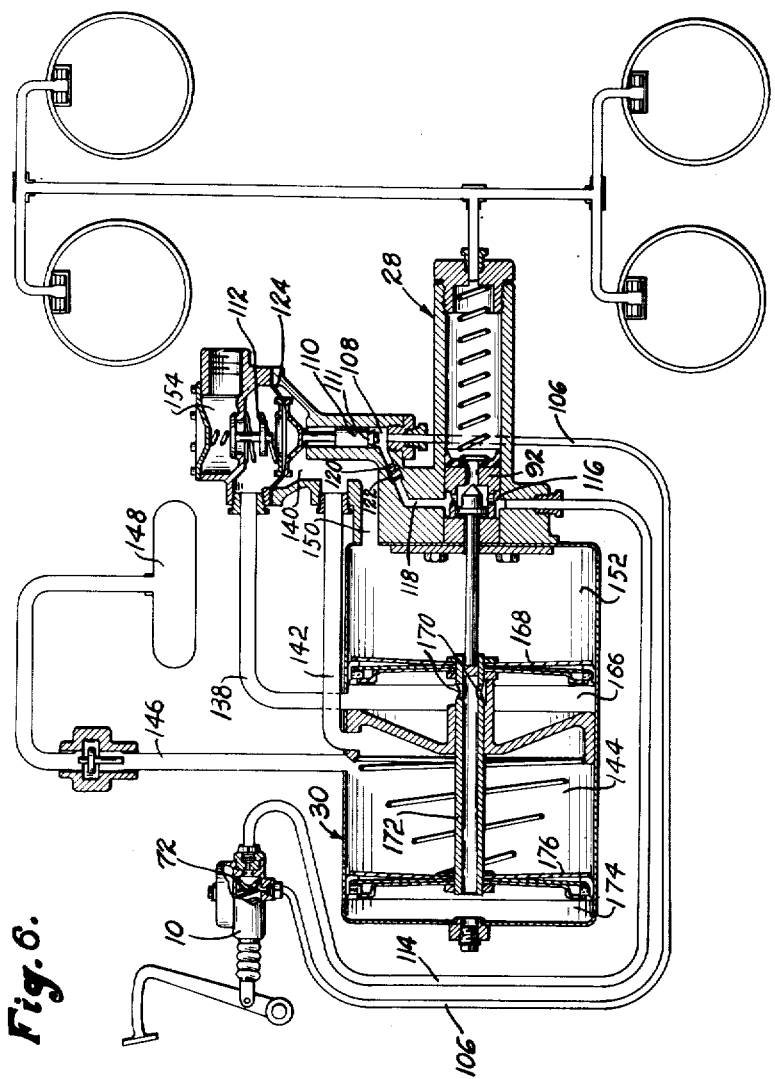
Figure 6 is a view, partly diagrammatic and partly sectional, of a "double line" system having the means for preventing pedal flutter referred to above.

The device of Figures 6 to 11, inclusive, operates to prevent pedal flutter as follows. As soon as the piston 110 has been actuated to operate the valve 112, the valve actuates the power cylinder 30, and simultaneously causes a reaction to be exerted by diaphragm 124 through piston 110 against the hydraulic fluid. This reaction forces the fluid through the passage 118 directly into chamber 116. Since actuation of the power cylinder 30 causes the piston in the power cylinder to exert a force on piston 92 of auxiliary cylinder 28, moving piston 92 to increase the brake applying force and to simultaneously increase the volume of chamber 116, the reaction created in the valve 112 will almost instantaneously be absorbed by the expansion of chamber 116, i. e. any excess flow of fluid caused by said reaction will be immediately received in chamber 116. In a "double line" system which does not have the passage 118, fluid forced by reaction of the valve out of chamber 108 has to travel back to the master cylinder 10 and thence to chamber 116. In such a case the reaction would be felt by the operator through the pedal before movement of piston 92 had a chance to compensate for such reaction, with the result that the force required to move the pedal would vary in intensity. Because the one way check valve 120 (see Fig. 7 for a close-up) prevents flow of fluid from chamber 116 to chamber 108, the chamber 108 may be maintained at the same pressure as the reservoir of master cylinder 10, even though valve 72 maintains a residual pressure in chamber 116 at all times. The only difference between Figures 6 and 7 on the one hand, and Figures 8 to 11, inclusive, on the other, is that Figures 6 and 7 show diagrammatically what Figures 8 to 11, inclusive, show in commercial form. The corresponding parts are marked with the same numerals in both cases.

Figure 8:
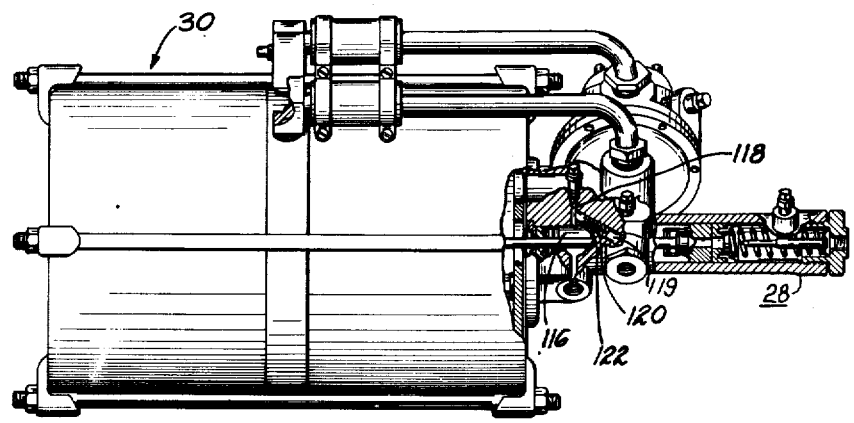
Figure 8 is a view, partly in side elevation and partly in section, showing the commercial embodiment of the invention illustrated in Figure 6.

In Figure 8, the chamber 116 at the rear of the piston in the master cylinder 28 is connected by means of the passage 118 and a branch passage 119 with the chamber 108 of the control valve. As in the device of Figures 6 and 7, a one-way check valve, comprising a ball valve element 120 and a spring 122, permits direct flow of fluid from chamber 108 to chamber 116, but prevents flow in the reverse direction.

Figure 11:
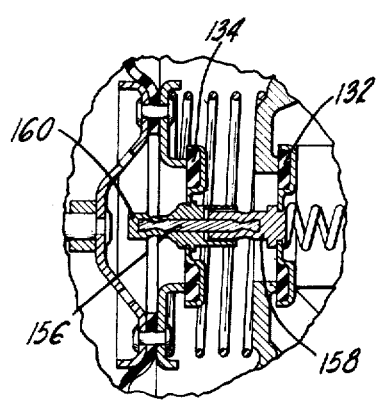
Figure 11 is an enlarged section taken through the poppet valve arrangement of Figure 10.

The control valve itself is substantially the same as the control valve shown in Figures 6 and 7. A close-up of the valve is shown in Figure 11, which illustrates its construction most clearly. As described above, the poppets 132 and 134 are flexibly connected by means of a cable 156, which is encased in the telescoping sleeves 158 and 160, a radial clearance being allowed between the sleeves in order to permit relative lateral movement of the poppets to align themselves with their respective seats.

Figure 10:
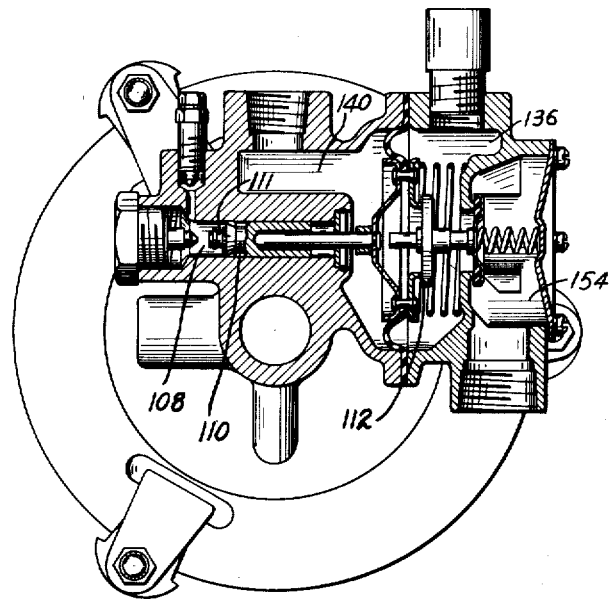
Figure 10 is an enlarged section taken through the valve of Figure 8.

In the valve device of Figures 10 and 11, the chamber 154 is directly connected to atmosphere, the chamber 136 is connected to operate the power cylinder, and the chamber 140 is connected to the vacuum source. It will thus be apparent that the operation of this valve corresponds to the operation of the valve shown in Figures 6 and 7, and described above.

The particular valve structure disclosed in this application has been made the basis of divisional application Serial No. 751,283, filed May 29, 1947.

Although my invention has been described with reference to certain specific embodiments, it is intended that the following claims, rather than said embodiments, be determinative of the scope of my invention.

I claim:

1. For use in a hydraulic pressure system which includes a motor cylinder and a master cylinder unit having a reservoir; a power assistor unit comprisng an auxiliary cylinder having an inlet port adapted to be connected to the master cylinder and an outlet port adapted to be connected to the motor cylinder, a piston reciprocable in said auxiliary cylinder between said inlet and outlet ports, a check valve between the auxiliary cylinder piston and the motor cylinder for maintaining a predetermined pressure in the motor cylinder, a lower cylinder for exerting pressure on the auxiliary cylinder piston, and a valve for controlling the power cylinder responsive directly to the pressure in the master cylinder.

2. For use in a liquid pressure braking system which includes a primary master cylinder having an operator operated piston for creating pressure therein, and a wheel cylinder which is actuated by liquid under pressure; a power assistor comprising a secondary master cylinder having an inlet port which is adapted to be connected to the primary master cylinder to permit the flow of liquid under pressure from the primary master cylinder to the secondary master cylinder, a piston reciprocable in the secondary master cylinder, said secondary master cylinder having an outlet port which is located on the opposite side of said piston from the inlet port and which is adapted to be connected to the wheel cylinder, a two-way valve between the secondary master cylinder piston and the wheel cylinder which allows a free flow of liquid from the secondary master cylinder toward the wheel cylinder but which is biased to maintain a slight residual pressure on the liquid in the wheel cylinder, a differential air pressure power device for moving the secondary master cylinder piston to create pressure in said secondary master cylinder to augment the pressure created therein by the primary master cylinder, valve means for controlling the differential air pressure power device, and a liquid pressure responsive motor which is connected to and responsive to the liquid pressure prevailing between the primary master cylinder piston and the secondary master cylinder piston and which operates the aforesaid valve means.

3. In a liquid pressure system, a motor operable by liquid pressure, pressure producing means connected to the motor for placing the liquid therein under pressure, a power device associated with the liqud connection between the pressure producing means and the motor to enhance the pressure produced at said motor by the pressure producing means, a check valve in the liquid line between the power device and the motor for maintaining the liquid in the motor under slight residual pressure, and a second motor operated by the pressure of liquid in the pressure producing means and adapted to control operation of the power device.

4. In combination, a master cylinder unit having a reservoir, an auxiliary cylinder having a piston reciprocable therein, a conduit connecting the master cylinder to the auxiliary cylinder at the rear of said piston, a check valve in the master cylinder for maintaining a predetermined pressure in the conduit, a motor cylinder connected to the auxiliary cylinder in front of the auxiliary cylinder piston, a pneumatic power unit for exerting pressure on said piston, thereby increasing the pressure at the motor cylinder and causing the chamber at the rear of the piston to expand, a hydraulically operated valve for controlling the power unit, a conduit connecting the hydraulic portion of the valve to the master cylinder on the reservoir side of the master cylinder check valve, and a passage forming a direct hydraulic connection between the hydraulically operated valve and the chamber at the rear of the auxiliary cylinder piston.

5. In combination, a master cylinder unit having a reservoir, an auxiliary cylinder having a piston reciprocable therein, a conduit connecting the master cylinder to the auxiliary cylinder at the rear of said piston, a check valve in the master cylinder for maintaining a predetermined pressure in the conduit, a motor cylinder connected to the auxiliary cylinder in front of said piston, a pneumatic power unit for exerting pressure on the piston in the auxiliary cylinder, thereby increasing the pressure at the motor cylinder and causing the chamber at the rear of the piston to expand, a hydraulically operated valve for controlling the power unit, a conduit connecting the valve to the master cylinder on the reservoir side of the master cylinder check valve, a passage forming a direct hydraulic connection between the hydraulic portion of the hydraulically controlled valve and the chamber at the rear of the auxiliary cylinder piston, and a one-way automatic valve in said passage which allows flow of fluid from the valve to the chamber but prevents flow from the chamber to the valve.

6. A liquid pressure braking system comprising a primary master cylinder having an operator operated piston for creating pressure therein, a secondary master cylinder having an inlet port connected to the primary master cylinder to permit the flow of liquid under pressure from the primary master cylinder to the secondary master cylinder, a two-way valve between the primary master cylinder and the inlet port of the secondary master cylinder allowing a free flow of liquid from the primary master cylinder toward the secondary master cylinder but biased to maintain a slight residual pressure on the liquid in the secondary master cylinder, a wheel cylinder connected to the secondary master cylinder and actuated according to the liquid pressure in said secondary master cylinder, a differential air pressure power device for creating pressure in the secondary master cylinder to augment the pressure created therein by the primary master cylinder, valve means for controlling the differential air pressure power device, a liquid pressure responsive motor which is connected to and responsive to the liquid pressure prevailing between the primary master cylinder piston and the two-way valve and which operates the aforesaid valve means, and a conduit forming a direct hydraulic connection between said motor and the secondary master cylinder on the inlet side of said secondary master cylinder.

7. A liquid pressure braking system comprising a primary master cylinder having an operator operated piston for creating pressure therein, a secondary master cylinder having an inlet port connected to the primary master cylinder to permit the flow of liquid under pressure from the primary master cylinder to the secondary master cylinder, a two-way valve between the primary master cylinder and the inlet port of the secondary master cylinder allowing a free flow of liquid from the primary master cylinder toward the secondary master cylinder but biased to maintain a slight residual pressure on the liquid in the secondary master cylinder, a wheel cylinder connected to the secondary master cylinder and actuated according to the liquid pressure in said secondary master cylinder, a differential air pressure power device for creating pressure in the secondary master cylinder to augment the pressure created therein by the primary master cylinder, valve means for controlling the differential air pressure power device, a liquid pressure responsive motor which is connected to and responsive to the liquid pressure prevailing between the primary master cylinder piston and the two-way valve and which operates the aforesaid valve means, a conduit forming a direct hydraulic connection between said motor and the secondary master cylinder on the inlet side of said secondary master cylinder, and a check valve in said conduit which allows fluid to flow from the motor to the secondary master cylinder but prevents it from flowing in the reverse direction.

8. A liquid pressure system comprising a main master cylinder unit having a reservoir, an auxiliary master cylinder connected to said main master cylinder, a motor cylinder connected to the auxiliary master cylinder, a residual pressure check valve in the system for maintaining a slight pressure in the motor cylinder at all times, a pneumatic pressure power unit for exerting pressure on fluid in the auxiliary master cylinder, a valve for controlling the power unit, a hydraulic motor for operating the valve responsive to the pressure in the master cylinder, said motor being only under reservoir pressure until said main master cylinder is actuated, means associated with the valve for exerting a reaction on the fluid in the main master cylinder proportional to the action of the power unit, and a direct fluid connection from the motor which operates the valve to the auxiliary master cylinder allowing the fluid under reaction to be forced from said motor directly into said auxiliary master cylinder.

9. A liquid pressure braking system comprising a primary master cylinder having an operator operated piston for creating pressure therein, a secondary master cylinder having a piston therein which is responsive to the pressure in the primary master cylinder, a wheel cylinder connected to the secondary master cylinder and actuated according to the liquid pressure produced by the piston in said secondary master cylinder, a residual pressure check valve in the system for maintaining in the wheel cylinder a pressure above atmospheric pressure, a differential air pressure power device for creating pressure in the secondary master cylinder to augment the pressure created therein by the primary master cylinder, valve means for controlling the differential air pressure power device, a liquid pressure responsive motor which operates the aforesaid valve means, a hydraulic conduit connecting the primary master cylinder to said motor which conduit is normally under only atmospheric pressure, means associated with said valve means for causing a reaction on the fluid in the primary master cylinder proportional to the effort exerted by the power device, and a direct fluid connection from said motor to the secondary master cylinder on the inlet side of the piston therein which allows the fluid under reaction to flow directly from the motor to the secondary master cylinder without returning to the primary master cylinder.

10. A liquid pressure braking system comprising a primary master cylinder having an operator operated piston for creating pressure therein, a secondary master cylinder having an inlet port connected to the primary master cylinder to permit the flow of liquid under pressure from the primary master cylinder to the secondary master cylinder, a piston reciprocable in the secondary master cylinder, a wheel cylinder connected to the secondary master cylinder on the opposite side of said piston from the primary master cylinder connection and actuated according to the liquid pressure in said secondary master cylinder, a two-way valve between the secondary master cylinder piston and the wheel cylinder allowing a free flow of liquid from the secondary master cylinder toward the wheel cylinder but biased to maintain a slight residual pressure on the liquid in the wheel cylinder, a differential air pressure power device for moving the secondary master cylinder piston to create pressure in said secondary master cylinder, valve means for controlling the differential air pressure power device, and a liquid pressure responsive motor which is connected to and responsive to the liquid pressure prevailing between the primary master cylinder piston and the secondary master cylinder piston and which operates the aforesaid valve means.

11. For use in a power and manually operated fluid pressure system having a primary master cylinder, a motor, and a differential pressure power device; a secondary master cylinder having an inlet port in communication with the primary master cylinder and an outlet port in communication with the motor, pressure transmitting means in said secondary master cylinder between said inlet and outlet ports arranged to transmit the combined pressure developed by the primary master cylinder and the differential pressure power device to the motor, and valve means between said pressure transmitting means and the motor for requiring a predetermined pressure to permit return of fluid from the motor to the secondary master cylinder.

12. For use in a power and manually operated fluid pressure system having a primary master cylinder, a motor, and a differential pressure power device; a secondary master cylinder having an inlet port in communication with the primary master cylinder and an outlet port in communication with the motor, piston means in said secondary master cylinder between said inlet and outlet ports arranged to transmit the combined pressure developed by the primary master cylinder and the differential pressure power device to the motor, and a check valve between said piston means and the motor for requiring a predetermined pressure to permit return of fluid from the motor to the secondary master cylinder.

13. For use in a power and manually operated fluid pressure system having a primary master cylinder, a motor, a differential pressure power device, and valve means acted on by the pressure in said primary master cylinder and arranged to control said power device; a secondary master cylinder having an inlet port in communication with the primary master cylinder and an outlet port in communication with the motor, pressure transmitting means in said secondary master cylinder between said inlet and outlet ports arranged to transmit the combined pressure developed by the primary master cylinder and the differential pressure power device to the motor, and a check valve between said pressure transmitting means and the motor for requiring a predetermined pressure to permit return of fluid from the motor to the secondary master cylinder.

14. A liquid pressure system comprising a main master cylinder unit having a reservoir, an auxiliary master cylinder connected to said main master cylinder, a motor cylinder connected to the auxiliary master cylinder, a residual pressure check valve in the system for maintaining a slight pressure in the motor cylinder, a pneumatic pressure power unit for exerting pressure on fluid in the auxiliary master cylinder, a valve for controlling the power unit, a hydraulic motor for operating the valve responsive to the pressure in the master cylinder, said motor being only under reservoir pressure until said main master cylinder is actuated, means associated with said valve-operating hydraulic motor for exerting a reaction therethrough on the fluid in the main master cylinder, and a direct fluid connection from said valve-operating hydraulic motor to the auxiliary master cylinder allowing the fluid under reaction to be forced from said motor directly into said auxiliary master cylinder.

15. For use in a hydraulic pressure system, a power assistor unit comprising a power cylinder, a pressure responsive member movable therein, a master cylinder associated with said power cylinder and having an inlet port adapted to be connected to an operator operated master cylinder and an outlet port adapted to be connected to a hydraulically operated motor, pressure transmitting means reciprocable in the first-mentioned master cylinder and located between said inlet and outlet ports, said pressure transmitting means being operatively connected to the aforementioned pressure responsive member and being operable jointly by the effort of the operator operated master cylinder and the effort of said pressure responsive member, valve means for controlling operation of said pressure responsive member, a hydraulic motor arranged to actuate said valve means and adapted to be connected to the operator operated master cylinder, and a residual pressure check valve located in the first-mentioned master cylinder and arranged to maintain after release of the applying pressure a predetermined pressure on the outlet side of said master cylinder, said check valve including a first normally closed valve element which opens to permit flow of liquid to the motor and a second normally closed spring-urged valve element which opens to permit return flow of liquid from the motor only when the pressure tending to unseat the valve element exceeds a certain predetermined amount.

16. For use in a hydraulic pressure system, a power assistor comprising a power cylinder, a pressure responsive movable wall therein, a master cylinder associated with said power cylinder and having an inlet port adapted to be connected to an operator operated master cylinder and an outlet port adapted to be connected to a hydraulically operated motor, a piston reciprocable in the first-mentioned master cylinder and located between said inlet and outlet ports, said piston being operatively connected to the aforementioned movable wall and being operable jointly by the effort of the operator operated master cylinder and the effort of said movable wall, a control valve for regulating operation of said movable wall, a hydraulic motor arranged to actuate said valve and adapted to be connected to the operator operated master cylinder, and a residual pressure check valve located in the first-mentioned master cylinder between the piston and the outlet port and arranged to maintain after release of the applying pressure a predetermined pressure on the outlet side of said master cylinder.

EARL R. PRICE.

REFERENCES CITED

The following references are of record in the file of this patent:

UNITED STATES PATENTS

| Number | Name | Date |
|---|---|---|
| 2,215,602 | Baade | Sept. 24, 1940 |
| 2,260,492 | Stelzer | Oct. 28, 1941 |
| 2,305,638 | Rockwell | Dec. 22, 1942 |
| 2,332,340 | Price | Oct. 19, 1943 |

Certificate of Correction

Patent No. 2,446,884.　　　　　　　　　　　　　　　　　　August 10, 1948.

EARL R. PRICE

It is hereby certified that errors appear in the printed specification of the above numbered patent requiring correction as follows:

Column 8, line 40, for "comprisng" read *comprising*; line 48, for "lower" read *power*;

and that the said Letters Patent should be read with these corrections therein that the same may conform to the record of the case in the Patent Office.

Signed and sealed this 7th day of December, A. D. 1948.

[SEAL]

THOMAS F. MURPHY,
*Assistant Commissioner of Patents.* to the operator operated master cylinder, and a residual pressure check valve located in the first-mentioned master cylinder and arranged to maintain after release of the applying pressure a predetermined pressure on the outlet side of said master cylinder, said check valve including a first normally closed valve element which opens to permit flow of liquid to the motor and a second normally closed spring-urged valve element which opens to permit return flow of liquid from the motor only when the pressure tending to unseat the valve element exceeds a certain predetermined amount.

16. For use in a hydraulic pressure system, a power assistor comprising a power cylinder, a pressure responsive movable wall therein, a master cylinder associated with said power cylinder and having an inlet port adapted to be connected to an operator operated master cylinder and an outlet port adapted to be connected to a hydraulically operated motor, a piston reciprocable in the first-mentioned master cylinder and located between said inlet and outlet ports, said piston being operatively connected to the aforementioned movable wall and being operable jointly by the effort of the operator operated master cylinder and the effort of said movable wall, a control valve for regulating operation of said movable wall, a hydraulic motor arranged to actuate said valve and adapted to be connected to the operator operated master cylinder, and a residual pressure check valve located in the first-mentioned master cylinder between the piston and the outlet port and arranged to maintain after release of the applying pressure a predetermined pressure on the outlet side of said master cylinder.

EARL R. PRICE.

REFERENCES CITED

The following references are of record in the file of this patent:

UNITED STATES PATENTS

| Number    | Name     | Date          |
|-----------|----------|---------------|
| 2,215,602 | Baade    | Sept. 24, 1940 |
| 2,260,492 | Stelzer  | Oct. 28, 1941 |
| 2,305,638 | Rockwell | Dec. 22, 1942 |
| 2,332,340 | Price    | Oct. 19, 1943 |

Certificate of Correction

Patent No. 2,446,884.

August 10, 1948.

EARL R. PRICE

It is hereby certified that errors appear in the printed specification of the above numbered patent requiring correction as follows:

Column 8, line 40, for "comprisng" read *comprising*; line 48, for "lower" read *power*;

and that the said Letters Patent should be read with these corrections therein that the same may conform to the record of the case in the Patent Office.

Signed and sealed this 7th day of December, A. D. 1948.

[SEAL]

THOMAS F. MURPHY,
*Assistant Commissioner of Patents.*